United States Patent [19]

Pipper et al.

[11] Patent Number: 5,039,786
[45] Date of Patent: Aug. 13, 1991

[54] CONTINUOUS PREPARATION OF COPOLYAMIDES FROM CAPROLACTAM AND SALT OF DIAMINE AND DICARBOXYLIC ACID

[75] Inventors: Gunter Pipper, Bad Duerkheim; Claus Cordes, Weisenheim; Franz Schmidt, Mannheim; Horst Reimann, Worms; Eckhard M. Koch, Fussgoenheim, all of Fed. Rep. of Germany

[73] Assignee: BASF Aktiengesellschaft, Ludwigshafen, Fed. Rep. of Germany

[21] Appl. No.: 500,946

[22] Filed: Mar. 29, 1990

[30] Foreign Application Priority Data

Apr. 19, 1989 [DE] Fed. Rep. of Germany ....... 3912768

[51] Int. Cl.$^5$ ............................................. C08G 69/14
[52] U.S. Cl. ..................... 528/324; 526/64; 526/66; 526/68; 526/71; 528/331; 528/336
[58] Field of Search ............... 528/324, 331, 336; 526/64, 66, 68, 71

[56] References Cited

U.S. PATENT DOCUMENTS 4,053,457 10/1977 Cordes et al. ..................... 260/76 L
4,465,821 8/1984 Nielinger et al. ..................... 528/324

Primary Examiner—Harold D. Anderson
Attorney, Agent, or Firm—Keil & Weinkauf

[57] ABSTRACT

Copolyamides are prepared by a continuous process in which
(a) an aqueous solution of salts of equimolar amounts of diamines and dicarboxylic acids is passed, under superatmospheric pressure and with simultaneous evaporation of water, through a tubular precondensation zone with formation of a vapor phase and a prepolymer at above the melting point of the prepolymer,
(b) the vapor phase is separated from the prepolymer melt,
(c) the vapor phase is separated in a column into steam and an aqueous diamine solution, and the aqueous solution containing diamines is recycled to the polymerization,
(d) the prepolymer melt is mixed with molten caprolactam at polyamide-forming temperatures, and
(e) the mixture of prepolymer and caprolactam is passed downward through a vertical polymerization tube at polyamide-forming temperatures and a copolyamide is obtained.

11 Claims, No Drawings

CONTINUOUS PREPARATION OF COPOLYAMIDES FROM CAPROLACTAM AND SALT OF DIAMINE AND DICARBOXYLIC ACID

East German Patent 110,507 discloses a process for the preparation of copolyamides from caprolactam and salts of diamines and dicarboxylic acids, e.g. AH salt, in which caprolactam, AH salt and water are fed into a precondensation tube from the top and the corresponding copolyamide is removed from the lower part. The process has the disadvantage that diamine is discharged together with the vapors escaping from the top of the precondensation tube and is lost. Another disadvantage of the process is that the water released by the AH salt solution introduced makes it very difficult to control the temperature precisely at the top of the precondensation tube.

It is an object of the present invention to provide a continuous process for the preparation of copolyamides from caprolactam and salts of diamines and dicarboxylic acids, in which the volatile amines are recovered and recycled, constant quality of the copolyamide produced being maintained even with regard to the content of terminal groups and at the same time the temperature control at the top of the precondensation tube being improved.

We have found that this object is achieved by a continuous process for the preparation of copolyamides from caprolactam and salts of diamines and dicarboxylic acids, in which caprolactam is passed, together with polyamide-forming compounds obtained from dicarboxylic acids and diamines, downward through a vertical polymerization tube at polyamide-forming temperatures, wherein (a) an aqueous solution of salts of equimolar amounts of diamines and dicarboxylic acids is passed, under superatmospheric presure and with simultaneous evaporation of water, through a tubular precondensation zone with formation of a vapor phase and a prepolymer at above the melting point of the prepolymer, (b) the vapor phase is separated from the prepolymer melt, (c) the vapor phase is separated in a column into steam and an aqueous diamine solution, and the aqueous solution containing diamines is recycled to the polymerization, (d) the prepolymer melt is mixed with molten caprolactam at polyamide-forming temperatures, and (e) the mixture of prepolymer and caprolactam is passed downward through a vertical polymerization tube at polyamide-forming temperatures and a copolyamide is obtained.

The novel process has the advantage that it can be carried out continuously in a simple manner and diamines eliminated and other volatile components are recycled to the reaction. Another advantage of the novel process is that copolyamides of constant composition and uniform quality and having a balanced number of terminal groups are obtained.

According to the invention, salts of equimolar amounts of diamines and dicarboxylic acids in aqueous solution are used as copolyamide components. Preferred diamines are of the formula I $$H_2N-R_1-NH_2 \qquad \qquad I$$

where $R_1$ is alkylene of 4 to 16, in particular 4 to 8, carbon atoms or 1,3- or 1,4-phenylene. Examples of suitable compounds are 1,4-diaminobutane, hexamethylenediamine, octamethylenediamine, decamethylenediamine, 1,3-phenylenediamine and 1,4-phenylenediamine. Diamines of the formula I in which $R_1$ is straight-chain alkylene of 4 to 8 carbon atoms, especially hexamethylenediamine, have become particularly important industrially.

Preferred dicarboxylic acids are of the formula II $$HOOC-R_2-COOH \qquad \qquad II$$

where $R_2$ is alkylene of 4 to 12, in particular 4 to 8, carbon atoms or 1,3- or 1,4-phenylene. Examples of suitable dicarboxylic acids are adipic acid, azelaic acid, sebacic acid, suberic acid, dodecanedioic acid, terephthalic acid and isophthalic acid. Adipic acid, dodecanedioic acid, terephthalic acid and isophthalic acid are particularly preferred. Salts of adipic acid/hexamethylenediamine, terephthalic acid/hexamethylenediamine, isophthalic acid/hexamethylenediamine and dodecanedioic acid/hexamethylenediamine have become particularly important industrially.

Of course, diamines and dicarboxylic acids are used in equimolar amounts. The aqueous solutions used contain, as a rule, from 30 to 70, in particular from 50 to 65, % by weight of the stated salts. Aqueous solutions generally have a pH of 7.7 at 20° C. Aqueous solutions at from 80° to 100° C. are advantageously used.

In addition to the salts of diamines and dicarboxylic acids, caprolactam is advantageously used. It has proven particularly useful to use an aqueous solution of caprolactam which contains, for example, from 60 to 90% by weight of caprolactam and has been obtained by extraction of the resulting copolyamide with water and evaporation of the aqueous extract, preferably with the addition of from 0.5 times to twice the amount, based on extracted lactam, of fresh lactam. A suitable solution is obtained, for example, by the process described in German Published Application DAS 2,501,348. The amount of caprolactam present is, as a rule, from 5 to 50, in particular from 5 to 30, % by weight of the total amount of caprolactam used in the novel process.

According to the invention, in stage a an aqueous solution of salts of diamines and equivalent amounts of dicarboxylic acids and, if required, caprolactam is passed, under superatmospheric pressure and with simultaneous evaporation of water, through a tubular precondensation zone with formation of a vapor phase and a prepolymer at above the melting point of the prepolymer. Advantageously, a temperature of from 250° to 350° C., in particular from 255° to 285° C., is maintained in the precondensation zone. As a rule, a pressure of from 0.5 to 2.5 bar is maintained in the precondensation zone. The residence time in the precondensation zone is advantageously from 40 to 600 seconds. It has also proven useful if the conversion on emergence from the precondensation zone is >81%, in particular from 86 to 96%, and the water of content of the prepolymer is <2% by weight.

In an advantageous procedure with residence times of from 40 to 120 seconds, the tubular precondensation zone is alternately tubular and slot-like. If longer residence times of 3-10 minutes are used, the tubular precondensation zone is advantageously provided with baffles, such as packing, Raschig rings or Pall rings, in particular wire mesh rings, in order to achieve a large surface area. The free surface area per liter of reaction space is advantageously from 0.7 to 1 5 m². In industry, it has proven useful if a plurality of parallel precondensation zones in the form of a tube bundle is used.

If only salts of diamines and dicarboxylic acids are used, on emergence from the precondensation zone the prepolymer advantageously has a relative viscosity of from 1.2 to 1.3, a conversion of from 81 to 82%, a content of terminal carboxyl groups of from 300 to 350 meq/kg and a content of terminal amino groups of from 300 to 350 meq/kg.

If caprolactam is additionally used, the prepolymer generally has a conversion of from 93 to 98%, a content of terminal carboxyl groups of from 450 to 480 meq/kg and a content of terminal amino groups of from 450 to 480 meq/kg.

In stage b, the two-phase mixture, of vapor phase and prepolymer, which emerges from the precondensation zone is separated. Separation is effected, as a rule, automatically on the basis of the physical differences in a vessel. The two-phase mixture of vapor phase and prepolymer is advantageously passed into the vapor space at the top of the tubular polymerization zone (precondensation tube) and the separation is carried out there.

In stage c, the vapor phase obtained is separated in a column into steam and an aqueous diamine solution and the latter is recycled to the polymerization. If caprolactam is present or the separation of the phases is carried out at the top of the tubular polymerization zone (precondensation tube), the vapors contain not only steam and diamines but also caprolactam and its dimers. Separation of the vapor phase is advantageously effected in a column with rectification. Examples of suitable columns are packed columns, bubble-cap columns, tray columns or sieve tray columns having from 5 to 15 theoretical plates. The column is advantageously operated under conditions identical to those in the separation of the vapor phase and the prepolymer, for example from 0.5 to 2.5 bar or under the pressure of the polymerization zone. Advantageously, from 0.1 to 0.5 l of water per kg of vapor is added at the top of the column in order to improve the separation effect. The bottom product obtained is an aqueous solution of volatile diamines and, if appropriate, caprolactam and its dimers. Steam is obtained at the top of the column and may be used for the solid phase condensation for the copolyamide.

As a rule, the aqueous solution containing diamines is recycled to stage a). If, in the preferred procedure, the separation is carried out at the top of the precondensation tube, the aqueous diamine solution is recycled to stage d.

The prepolymer melt is mixed in stage d with molten caprolactam at polyamide-forming temperatures. As a rule, the major amount of caprolactam, which is required for producing the copolyamide, is added. In a preferred procedure, the prepolymer and molten caprolactam are thus fed in at the top of the polymerization tube and are both mixed with the melt which is present there and which essentially consists of caprolactam, low molecular weight polycaprolactam, prepolymer and low molecular weight copolyamide. Mixing of the components at the top of the tubular polymerization zone is generally effected by stirring.

In stage e, the mixture of prepolymer and caprolactam is passed downward through a vertical polymerization tube (precondensation tube) at polyamide-forming temperatures and a copolyamide is obtained. In the upper third of the polymerization tube, as a rule a temperature of from 250° to 285° C., in particular from 255° to 280° C., is maintained. Because of the relatively high content of terminal groups in the prepolymer, the conversion in the first fourth of the polymerization tube, considered from the top, is up to 70%, for example from 65 to 70%. Along the polymerization tube, the melt is heated so that a melt at 240°-250° C. is obtained at the lower end. The residence time in the polymerization tube is as a rule from 8 to 14 hours. The copolyamide thus obtained generally has a relative viscosity of from 2.4 to 3.0 and contains from 3.5 to 10, in particular from 5 to 8, % by weight of substances extractable by water. The content of triamines is as a rule less than 0.06% by weight. The copolyamide melt thus obtained is generally extruded, solidified and granulated. The resulting granules are then continuously extracted with water by the countercurrent method at from 80° to 120° C. The aqueous extract thus obtained is then evaporated down, advantageously after the addition of from 0.5 times to twice the amount, based on extracted caprolactam, of fresh caprolactam. A suitable process is described in, for example, German Published Application DAS 2,501,348. In general, the extracted copolyamide is then dried. For this purpose, it is advantageously heated, for example at from 150° to 185° C., in the presence of an inert gas, such as nitrogen or superheated steam, as a heat transfer medium by the countercurrent method until the desired viscosity is reached. The steam obtained in stage c is advantageously used here.

Copolyamides obtainable by the process of the invention generally have from 70 to 95, in particular from 80 to 90, % by weight of nylon 6 units and are suitable for the production of moldings by injection molding or extrusion, and for the production of films and fibers.

The Examples which follow illustrate the process according to the invention.

EXAMPLES

EXAMPLE 1

A 62% strength by weight solution of AH salt is conveyed from a heated stock vessel at about 80° C. at a rate corresponding to 3 kg/h of polyamide by means of a metering pump into a vertical tubular evaporator. The evaporator is heated by means of a liquid heat transfer medium which is at 285° C., with vigorous circulation. The evaporator has a length of 3 m, a capacity of 180 ml and a heat transfer surface area of 1,300 cm². The residence time in the evaporator is 70 sec and the pressure is 0.9 bar. The mixture of prepolymer, steam and volatile components which emerges from the evaporator is introduced at 280° C. into the top of the precondensation tube and separated under a pressure of 100 mm (water column). The prepolymer is mixed, while stirring, with fresh caprolactam, which is introduced at the same time continuously in an amount of 18.7 kg/h in molten form at 80° C., and with the content in the top of the precondensation tube. After a residence time in the melt of about 10-11 h at a temperature of 255°-285° C., the resulting conversion is 92.0% and the molecular weight corresponds to $\eta_{rel}$ of from 2.9 to 3.0, measured in 1% strength solution in 98% strength $H_2SO_4$. The polymer melt is fed via a pump to an extruder and extruded through a die plate, and the extrudate is solidified in a water bath and granulated.

The superheated steam which is obtained during the separation at the top of the precondensation tube and which contains volatile components is fed to a column which has 10 theoretical plates and into the top of which about 1 l/h of vapor condensate is fed to improve the separation effect. A temperature of about 100° C. is established at the top of the column and the pressure is 100 mm (water column). The steam is condensed and has a hexamethylenediamine content of <0.01%, the content of caprolactam being 0.02%.

The bottom product of the column is an aqueous solution of 1.6-2.1% of hexamethylenediamine and 0.8-1.0% of caprolactam, the percentages being based on polyamide produced. The column discharge is recycled directly to the top of the precondensation tube.

After leaving the evaporator reactor, the prepolymer has an $\eta_{rel}$ of 1.25, measured in 1% strength solution in 98% strength $H_2SO_4$ at 20° C., and, according to terminal group analysis, has a conversion of 94%. The content of bishexamethylenetriamine is 0.01-0.03%, based on polyamide.

After the polymer melt has emerged from the precondensation tube, the copolyamide has a very pale natural color, an extremely low content of bishexamethylenetriamine of from 0.05 to 0.06%, based on copolyamide, and virtually equivalent amounts of terminal groups, i.e. 43.9 meq/kg of terminal carboxyl groups and 46.1 meq/kg of terminal amino groups, the amount of extractables in boiling methanol being 8.0%.

After the melt has emerged from the precondensation tube and has been cooled below the melting point in the water bath, the copolyamide is granulated and the granules are extracted with demineralized water by the countercurrent method (100°-120° C., residence time about 36 h). The resulting copolyamide has a residual content of extractables of 0.21%, determined in boiling methanol.

The extract-moist granules are dried in a shaft drier (167° C., $N_2$ countercurrent), the relative viscosity increasing from 2.9-3.0 to 3.4. The content of extractables is then 0.25%, the residual moisture content is <0.08% of water and the melting point (DSC) is 204° C.

EXAMPLE 2

Concomitant use of extracted lactam

Extracted lactam mixed with fresh lactam in a ratio of 1:1 (3 kg) is fed to the evaporator in the form of a 75% strength aqueous solution via a metering pump. Upstream of the evaporator, this solution is mixed with 6 l of a 62% strength aqueous solution of AH salt. The evaporator is arranged vertically and consists of a cylindrical tube which is filled with packing (Raschig rings). The evaporator has a free surface area of about 4 m² and is heated with a liquid heat transfer medium. The temperature upstream of the evaporator is 92° C. and the temperature downstream of the evaporator is 284° C. The residence time in the evaporator is about 8 minutes. The prepolymer has the following composition after leaving the evaporator reactor:

$\eta_{rel}$=1.20, —COOH=338, $NH_{2b}$=340, $H_2O$ content=0.5%, conversion=81%.

The reaction mixture is fed in the form of a two-phase mixture into the top of the precondensation tube. Fresh lactam is added continuously, similarly to Example 1, in an amount such that a copolyamide containing 85% by weight of nylon 6 units is obtained, and polycondensation is then carried out in the precondensation tube.

The vapors from the top of the precondensation tube, consisting of steam, caprolactam, hexamethylenediamine and small amounts of cyclic oligomers, preferably dimers, are fed to a column and rectified, and the aqueous solution is recycled to the top of the precondensation tube.

After a residence time of 11 h, a copolyamide having an $\eta_{rel}$ of 3.0 and a conversion of 92.5% is removed from the lower end of the precondensation tube.

After the melt has emerged from the precondensation tube and has been cooled below the melting point in a water bath, the copolyamide is granulated and extracted with demineralized water by the countercurrent method (100°-120° C., residence time 36 h). A copolyamide having a residual content of extractables of 0.21%, determined in boiling methanol, is obtained.

After the addition of the same amount of fresh lactam, based on the solids content of the solution, the resulting aqueous solution of extracted lactam is evaporated down to a content of 75% by weight and recycled to the evaporator reactor.

The extract-moist granules are dried in a shaft drier (167° C., $N_2$ countercurrent), the relative viscosity increasing from 2.9-3.0 to 3.4. The content of extractables is then 0.25%, the residual water content is <0.08% and the melting point (DSC) is 204° C.

We claim:

1. A process for the continuous preparation of a copolyamide from caprolactam and at least one salt of a diamine and a dicarboxylic acid, in which
   (a) an aqueous solution of at least one salt of equimolar amounts of diamine and dicarboxylic acid is passed, under superatmospheric pressure and with simultaneous evaporation of water, through a tubular precondensation zone with formation of a vapor phase and a prepolymer at above the melting point of the prepolymer,
   (b) the vapor phase is separated from the prepolymer melt,
   (c) the vapor phase is separated in a column into steam and an aqueous diamine solution, and the aqueous solution containing diamines is recycled to the polymerization,
   (d) the prepolymer melt is mixed with molten caprolactam at polyamide-forming temperatures, and
   (e) the mixture of prepolymer and caprolactam is passed downward through a vertical polymerization tube at polyamide-forming temperatures and a copolyamide is obtained.

2. A process as defined in claim 1, wherein the diamine has the formula I $$H_2N—R_1—NH_2 \qquad \text{I}$$

where $R_1$ is alkylene of 4 to 16 carbon atoms or 1,3-, or 1,4-phenylene, and the dicarboxylic acid has the formula II $$HOOC—R_2—COOH \qquad \text{II,}$$

where $R_2$ is alkylene of 4 to 12 carbon atoms or 1,3-. or 1,4-phenylene.

3. A process as defined in claim 1, wherein caprolactam is additionally present in stage (a).

4. A process as defined in claim 1, wherein caprolactam which has been obtained by extracting the copolyamide with water and then evaporating the aqueous extract is additionally present in stage (a).

5. A process as defined in claim 1, wherein from 5 to 50% by weight of the total amount of caprolactam is introduced in stage (a).

6. A process as defined in claim 1, wherein a temperature of from 250° to 350° C. is maintained in stage a.

7. A process as defined in claim 1, wherein a pressure of from 0.5 to 2.5 bar is maintained in stage a.

8. A process as defined in claim 1, wherein a residence time of from 40 to 600 seconds is maintained in stage a.

9. A process as defined in claim 1, wherein the vapor phase is separated from the prepolymer melt in the top of the vertical polymerization tube.

10. A process as defined in claim 1, wherein the vapor phase from the top of the polymerization tube is separated in a column into steam and an aqueous solution containing diamines, caprolactam or caprolactam dimers, and the aqueous solution is recycled to the top of the vertical polymerization tube or to stage a.

11. A process as defined in claim 1, wherein the prepolymer and molten caprolactam are mixed in the top of the polymerization tube.

* * * * *

UNITED STATES PATENT AND TRADEMARK OFFICE
CERTIFICATE OF CORRECTION

PATENT NO. : 5,039,786

DATED : August 13, 1991

INVENTOR(S) : Gunter PIPPER et al.

It is certified that error appears in the above-identified patent and that said Letters Patent is hereby corrected as shown below:

On the title page, item [54] and in column 1, lines 2-4:
    The title should read --CONTINUOUS PREPARATION OF COPOLYAMIDES FROM CAPROLACTAM AND SALT OF DIAMINE AND DICARBOXYLIC ACIDS--

Signed and Sealed this

Fifteenth Day of March, 1994

Attest:

BRUCE LEHMAN

Attesting Officer     Commissioner of Patents and Trademarks